United States Patent [19]
Kowarz et al.

[11] Patent Number: 6,144,481
[45] Date of Patent: Nov. 7, 2000

[54] METHOD AND SYSTEM FOR ACTUATING ELECTRO-MECHANICAL RIBBON ELEMENTS IN ACCORDANCE TO A DATA STREAM

[75] Inventors: Marek W. Kowarz, Rochester; Darren Karns, Gibsonia; Brian E. Kruschwitz, Rochester; John C. Brazas, Jr., Hilton, all of N.Y.

[73] Assignee: Eastman Kodak Company, Rochester, N.Y.

[21] Appl. No.: 09/215,106

[22] Filed: Dec. 18, 1998

[51] Int. Cl.[7] .................................................. G02B 5/18
[52] U.S. Cl. ........................... 359/291; 359/572; 359/573
[58] Field of Search .................................... 359/290, 291, 359/292, 295, 572, 573

[56] References Cited

U.S. PATENT DOCUMENTS

| | | | |
|---|---|---|---|
| 4,011,009 | 3/1977 | Lama et al. | 350/162 |
| 4,360,900 | 11/1982 | Bate | 365/184 |
| 4,492,435 | 1/1985 | Banton et al. | 350/360 |
| 4,596,992 | 6/1986 | Hornbeck | 346/76 |
| 5,115,344 | 5/1992 | Jaskie | 359/573 |
| 5,311,360 | 5/1994 | Bloom et al. | 359/572 |
| 5,459,610 | 10/1995 | Bloom et al. | 359/572 |
| 5,661,593 | 8/1997 | Engle | 359/292 |
| 5,677,783 | 10/1997 | Bloom et al. | 359/224 |
| 5,757,536 | 5/1998 | Ricco et al. | 359/224 |
| 5,808,797 | 9/1998 | Bloom et al. | 359/572 |
| 5,841,579 | 11/1998 | Bloom et al. | 359/572 |
| 5,844,711 | 12/1998 | Long, Jr. | 359/291 |
| 5,949,570 | 9/1999 | Shiono et al. | 359/291 |

OTHER PUBLICATIONS

C. Cabuz et al., High Reliability Touch–Mode Electrostatic Actuators (TMEA), *Solid–State Sensor and Actuator Workshop*, Hilton Head Island, South Carolina, Jun. 8–11, 1998, pp. 296–299.

*Primary Examiner*—Georgia Epps
*Assistant Examiner*—Margaret Burke
*Attorney, Agent, or Firm*—William F. Noval

[57] ABSTRACT

A method is disclosed for actuating electromechanical ribbon elements which are suspended over a channel. The channel defines a bottom surface having a bottom conductive layer formed below said bottom surface. A data generator provides a data stream. The data generator is connected to a modulator for generating from said data stream a modulated bipolar voltage signal whose time average is equal to the time average of a bias voltage applied to the bottom conductive layer. The data generator and the modulator are necessary to carry out the method. The method comprises the steps of: providing a data stream; generating from said data stream a modulated bipolar voltage signal whose time average is equal to the time average of a bias voltage applied to the bottom conductive layer; and applying said modulated bipolar voltage signal to the ribbon elements.

14 Claims, 11 Drawing Sheets

METHOD AND SYSTEM FOR ACTUATING ELECTRO-MECHANICAL RIBBON ELEMENTS IN ACCORDANCE TO A DATA STREAM

CROSS REFERENCE TO RELATED APPLICATIONS

Reference is made to U.S. Ser. No. 09/216,289 (EK Docket No. 78,657), filed concurrently, entitled "A Mechanical Grating Device," and to U.S. Ser. No. 09/216,559 (EK Docket No. 78,594), also filed concurrently, entitled "A Multilevel Electro-Mechanical Grating Device And A Method For Operating A Multilevel Mechanical And Electro-Mechanical Grating Device."

FIELD OF THE INVENTION

This invention relates to a method and a system for actuating electromechanical ribbon elements of a Grating Light Valve (GLV) in accordance to a data stream. More particularly the invention relates to a method and system which is able to prevent a charge accumulation in the dielectric elements of the GLV.

BACKGROUND OF THE INVENTION

Electro-mechanical spatial light modulators have been designed for a variety of applications, including image processing, display, optical computing and printing. Optical beam processing for printing with deformable mirrors has been described by L. J. Hornbeck; see U.S. Pat. No. 4,596,992, issued Jun. 24, 1984, entitled "Linear Spatial Light Modulator and Printer". A device for optical beam modulation using cantilever mechanical beams has also been disclosed; see U.S. Pat. No. 4,492,435, issued Jan. 8, 1985 to M. E. Banton, entitled "Multiple Array Full Width Electro-Mechanical Modulator," and U.S. Pat. No. 5,661,593, issued Aug. 26, 1997 to C. D. Engle, entitled "Linear Electrostatic Modulator". Other applications of electromechanical gratings include wavelength division multiplexing and spectrometers; see U.S. Pat. No. 5,757,536, issued May 26, 1998 to A. J. Ricco et al., entitled "Electrically Programmable Diffraction Grating".

Electro-mechanical gratings are well known in the patent literature; see U.S. Pat. No. 4,011,009, issued Mar. 8, 1977 to W. L. Lama et al., entitled "Reflection Diffraction Grating Having a Controllable Blaze Angle," and U.S. Pat. No. 5,115,344, issued May 19, 1992 to J. E. Jaskie, entitled "Tunable Diffraction Grating". More recently, Bloom et al. described an apparatus and method of fabrication for a device for optical beam modulation, known to one skilled in the art as a grating-light valve (GLV); see U.S. Pat. No. 5,311,360, issued May 10, 1994, entitled "Method and Apparatus for Modulating a Light Beam". This device was later described by Bloom et al. with changes in the structure that included: 1) patterned raised areas beneath the ribbons to minimize contact area to obviate stiction between the ribbon and substrate; 2) an alternative device design in which the spacing between ribbons was decreased and alternate ribbons were actuated to produce good contrast; 3) solid supports to fix alternate ribbons; and 4) an alternative device design that produced a blazed grating by rotation of suspended surfaces (see U.S. Pat. No. 5,459,610, issued Oct. 17, 1995 to Bloom et al., entitled "Deformable Grating Apparatus for Modulating a Light Beam and Including Means for Obviating Stiction Between Grating Elements and Underlying Substrate," and U.S. Pat. No. 5,808,797, issued Sep. 15, 1998 to Bloom et al., entitled "Method and apparatus for Modulating a Light Beam." Bloom et al. also presented a method for fabricating the device; see U.S. Pat. No. 5,677,783, issued Oct. 14, 1997, entitled "Method of Making a Deformable Grating Apparatus for Modulating a Light Beam and Including Means for Obviating Stiction Between Grating Elements and Underlying Substrate".

According to the prior art, for operation of the GLV device, an attractive electrostatic force is produced by a single polarity voltage difference between the ground plane and the conducting layer atop the ribbon layer. This attractive force changes the heights of the ribbons relative to the substrate. By modulating the voltage waveform, it is possible to modulate the diffracted optical beam as needed. However, a single polarity voltage waveform can lead to device operation difficulties if charge build-up occurs on the intermediate dielectric layers between the ground plane and the conductor on the ribbons. If this dielectric charge does not dissipate quickly enough after the actuation voltage is turned off, a significant charge accumulation can occur that leads to deterioration in the performance of the device with repetitive actuation.

Charge injection and trapping into insulating dielectric films, such as silicon nitride and silicon dioxide, on semiconductors is well known to occur in various microelectronic devices. Charging effects in silicon dioxide can be minimized by proper deposition, as described, for example, in "Charge transport and transport phenomena in off-stoichiometric silicon dioxide films," Journal of Applied Physics, 54, 1983, pp. 5801–5827, by D. J. Maria et al. On the other hand, charge injection into silicon nitride can be used beneficially in non-volatile memories such as the device described by R. T. Bate; see U.S. Pat. No. 4,360,900, issued Nov. 23, 1982, entitled "Non-Volatile Semiconductor Memory Elements". Charge trapping phenomena in rolling contact micro-electromechanical actuators have also been reported by C. Cabuz et al. in "High reliability touch-mode electrostatic actuators (TMEA)," Proc. of Solid-State Sensor and Actuator Workshop, Hilton Head, S.C., Jun. 8–11, 1998, pp. 296–299.

SUMMARY OF THE INVENTION

It is an object of the present invention to provide a method for actuating electromechanical ribbon elements wherein the inventive method minimizes charge accumulation in the dielectric layers of the ribbon elements. Additionally a stable device operation should be achieved in accordance with the inventive method.

This object is achieved with a method for actuating electro-mechanical ribbon elements suspended over a channel defining a bottom surface and having a bottom conductive layer formed below said bottom surface. The method comprises the steps of:

providing a data stream;

generating from said data stream a modulated bipolar voltage signal whose time average is equal to the time average of a bias voltage applied to the bottom conductive layer; and applying said modulated bipolar voltage signal to the ribbon elements.

Another object is to provide a system for actuating electro-mechanical grating elements wherein the inventive system minimizes charge accumulation in the dielectric layers of the grating elements. Additionally, stable device operation should be achieved in accordance with the inventive system.

This object is achieved with a system for actuating electro-mechanical ribbon elements suspended over a channel defining a bottom surface and having a bottom conductive layer formed below said bottom surface. The system comprises:

a data generator for providing a data stream; and a modulator for generating from said data stream a modulated bipolar voltage signal whose time average is equal to the time average of a bias voltage applied to the bottom conductive layer.

The above object is also achieved by a system for actuating electro-mechanical ribbon elements suspended over a channel defining a bottom surface and having a bottom conductive layer formed below said bottom surface. The system comprises:

a data generator for providing a data stream;

a polarity control counter; and a modulator for generating from the data stream a modulated bipolar voltage signal controlled by said polarity control counter.

An advantage of the inventive method and the system is the use of a DC-free bipolar waveform to actuate the GLV device ribbon elements. The DC-free waveform produces nearly the same temporal modulation of the diffracted optical beam as the corresponding single polarity waveform while minimizing charge accumulation in the dielectric layers of the electromechanical grating device located between the ribbon layer conductor and the conducting plane of the substrate. With a single polarity voltage waveform, the accumulated charge on the dielectrics results in a ribbon response that varies after multiple actuations, leading to an undesirable temporal variation in the diffracted optical beam and, in certain cases, to complete failure of a ribbon element through stiction. A DC-free bipolar voltage waveform minimizes charge accumulation, thus leading to a stable ribbon response. Further advantageous effects of the present invention are disclosed in the dependent claims.

BRIEF DESCRIPTION OF THE DRAWINGS

The subject matter of the invention is described with reference to the embodiments shown in the drawings.

DETAILED DESCRIPTION OF THE INVENTION

Figure 1A:
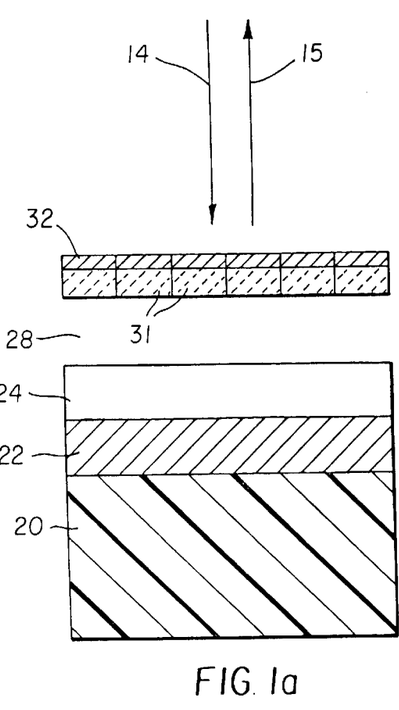
FIGS. 1a–1b is an illustration of light diffraction by a bi-level electro-mechanical grating device in the un-actuated and actuated state respectively.
Figure 1B:
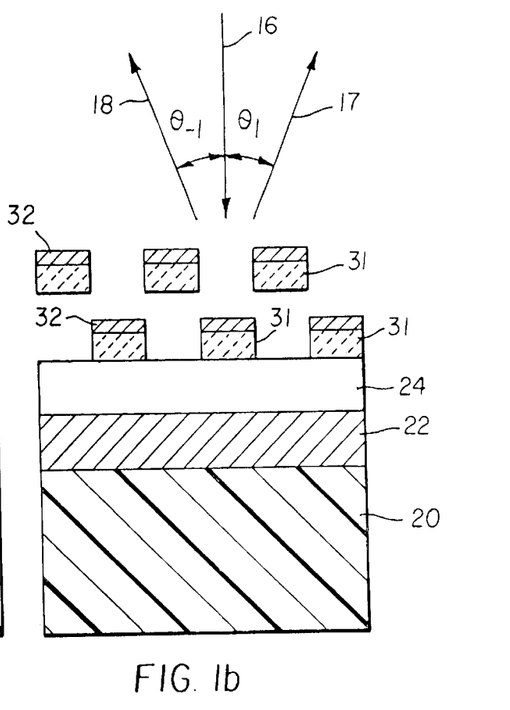
Figure 2:
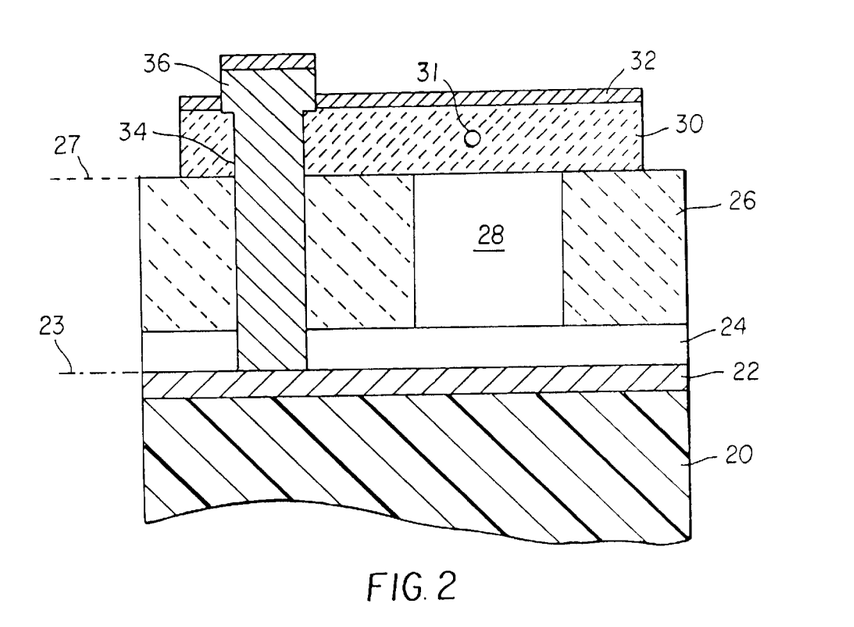
FIG. 2 is a view perpendicular to the illustration of FIG. 1 showing a suspended un-actuated ribbon element above the channel and with supporting layers.

The structure of a typical Grating Light Valve (GLV) device is shown in FIGS. 1a, 1b and 2. FIG. 1a depicts the ribbon structure of the device in the unactuated state and FIG. 1b in the actuated state. FIG. 2 is the view of the same device (as shown in FIG. 1a) in the unactuated state but rotated 90 degrees to provide an insight into the layer build-up of the GLV. Referring to FIG. 2, typically a substrate 20 is provided which may be single crystal silicon or glass. In the case of single crystal silicon, a bottom conductive layer 22 is generated by ion implantation near the surface 23 of the substrate 20. If glass is used as a substrate, the increased conductivity is achieved by the application of a bottom conductive layer 22 on top of the glass substrate 20. The conductive layer 22 is covered by a protective layer 24, which is for example of thermal oxide. A dielectric spacer layer 26 is formed atop the protective layer 24 and contains a channel 28 where the active region of the GLV device is located. The channel 28 defines a depth which is governed by the deposited thickness of the spacer layer 26. The spacer layer 26 defines an upper surface level 27. A plurality of ribbon elements 31 is patterned from a ribbon layer 30 formed atop the spacer layer 26. The ribbon layer 30 comprises a dielectric material, which may be of silicon nitride, covered by a conductive and reflective layer 32. The conductive and reflective layer 32 of every other ribbon element 31 is connected to the bottom conductive layer 22 through an opening 34 that is filled with a thick layer of conducting martial 36. The thickness and tensile stress of the ribbon layer 30 is chosen to optimize performance by influencing the electrostatic force required for actuation and the returning force, which affects the speed, resonance frequency and voltage requirements of the ribbon elements 31 of the GLV.

For operation of the device, an attractive electrostatic force is produced by a voltage difference between the bottom conductive layer 22 and the reflective and conductive layer 32 atop the ribbon layer 30. In the unactuated state (see FIG. 1a), with no voltage difference, all of the ribbon elements 31 in the GLV device are suspended above the substrate 20 at the same height. In this state, an incident light beam 14 is primarily reflected as from a mirror to form a reflected light beam 15. To obtain the actuated state (see FIG. 1b), a voltage is applied to every other ribbon element producing a grating (see FIG. 1a). In the fully actuated state every other ribbon element is in contact with the protective layer 24. When the height difference between adjacent ribbons is ¼ of the wavelength of an incident light beam 16 the light beam is primarily diffracted into a 1st order 17 and a–1$^{st}$ order 18. One or both of these diffracted orders can be collected and used by an optical system (not shown), depending on the application. When the applied voltage is removed, the force due to the tensile stress restores the ribbon elements 31 to their original un-actuated state (see FIG. 1a).

Figure 3:
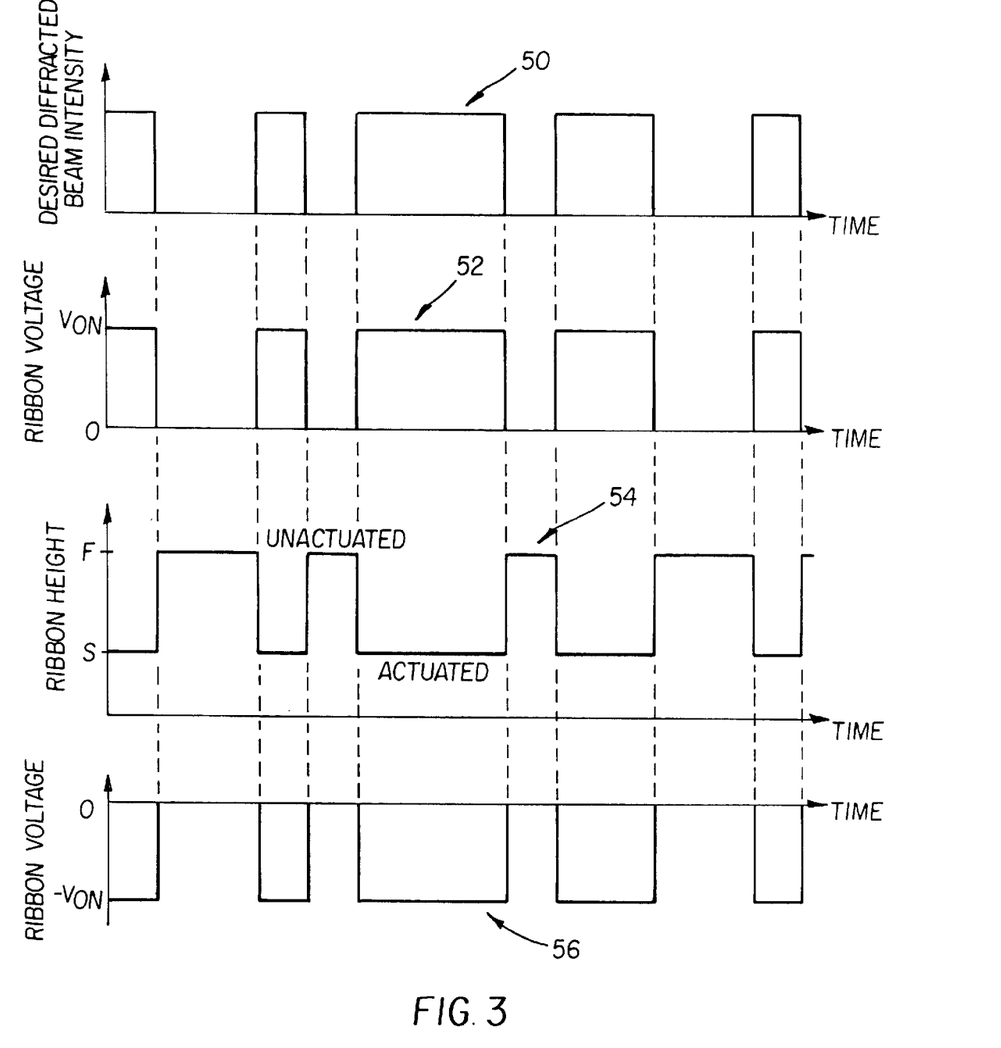
FIG. 3 is an illustration of unipolar voltage waveforms for actuating the ribbon elements to generate pulse width modulated light.

The intensity of the diffracted orders can be varied by modulating the voltage waveform applied to the ribbon elements 31. FIG. 3 illustrates modulation of the ribbon element voltage 52 with a positive polarity waveform to change the ribbon height 54 so as to obtain the pulse width modulation of a diffracted light intensity 50. An inverted ribbon element voltage waveform 56 with negative polarity can also produce the same variation in ribbon height 54. Other modulation techniques involving pulse position, pulse amplitude and hybrid schemes are also possible and well known in the art.

The voltage difference that produces the electrostatic force for actuation of the ribbon elements 31 leads to a large electric field in the electro-mechanical grating device (GLV), typically $10^8$ to $10^9$ V/m depending on material thicknesses and applied voltage. This electric field can cause injection and trapping of charge into the dielectric materials between the conductive layer 32 on top of the ribbon elements 31 and the bottom conductive layer 22. In microelectronic devices, charging is known to occur in a variety of insulating thin films including silicon nitride and silicon dioxide. Nitride in particular can be used as a charge storage layer in non-volatile memories because of its long-term charging capability. Charge accumulation on the ribbons of a grating light valve can cause detrimental variations in the operation of the device from one actuation to the next.

Figure 4A:
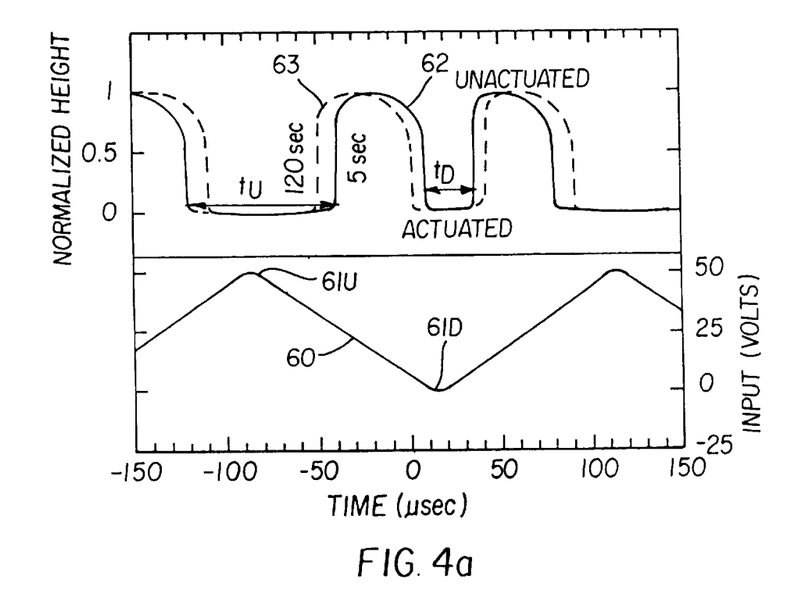
FIGS. 4a–4b show the change in ribbon behavior due to charging with actuation by a unipolar triangular waveform.

Charge accumulation with repeated actuation was observed on a GLV of the type as shown in FIG. 1a. The protective layer 24 of thermal oxide is formed on top of the bottom conductive layer 22. The ribbon elements 31 are made from a silicon nitride ribbon layer 30 and an aluminum conductive/reflective layer 32 on top of the ribbon layer 30. A 5 KHz 50V triangular voltage waveform with positive polarity was used to actuate the ribbons into contact with the protective layer of the substrate 20. A triangular waveform was chosen because it allows the charge accumulation to be quantified by measuring the length of time the ribbon elements 31 remain in contact with the substrate 20 during each actuation, i.e., the ribbon down time. FIG. 4a shows an applied unipolar triangular waveform 60 and the time-dependent position of a single ribbon element 31 for two different time delays, 5 and 120 seconds, after the onset of actuation. Graph 62 displays the height of the ribbon element 31 versus time 5 seconds after actuation. Graph 63 displays the height f the ribbon element 31 versus time 120 seconds after actuation. The behavior of the ribbon element 31 is significantly different 120 seconds 63 after actuation than at 5 seconds 62. Measurement of the time intervals $t_U$ and $t_D$ (shown in FIGS. 4a and 4b) with a time interval analyzer (TIA) provides a convenient means for monitoring the change in response of the ribbon from one actuation to the next. Here $t_U$ is the time the ribbon element is in contact with the surface (down time) when the voltage of the applied waveform 60 is near its maximum 61U and $t_D$ is the time the ribbon element is in contact when the voltage is near its minimum 61D, which is zero in this case.

Figure 4B:
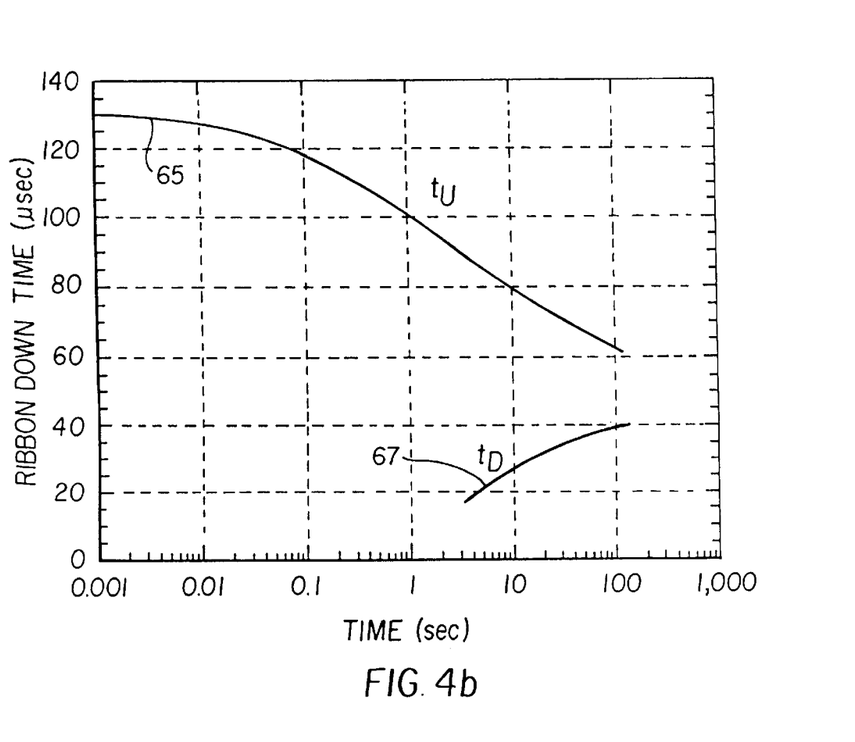

FIG. 4b shows the measured TIA data as a function of time delay after initial actuation. Before any significant charging occurs 65, the ribbon element 31 down time $t_U$ is approximately 130 μsec and the down time $t_D$ is zero because the ribbons do not actuate when the voltage waveform 60 is near zero. After approximately 3 seconds and roughly 15000 actuations, ribbon charging becomes large enough to fully actuate the ribbon when the applied voltage is near zero and $t_D$ becomes non-zero 67. If the applied voltage waveform is turned off past this point, the ribbon element 31 will become fully actuated because of the accumulated charge present.

Figure 5A:
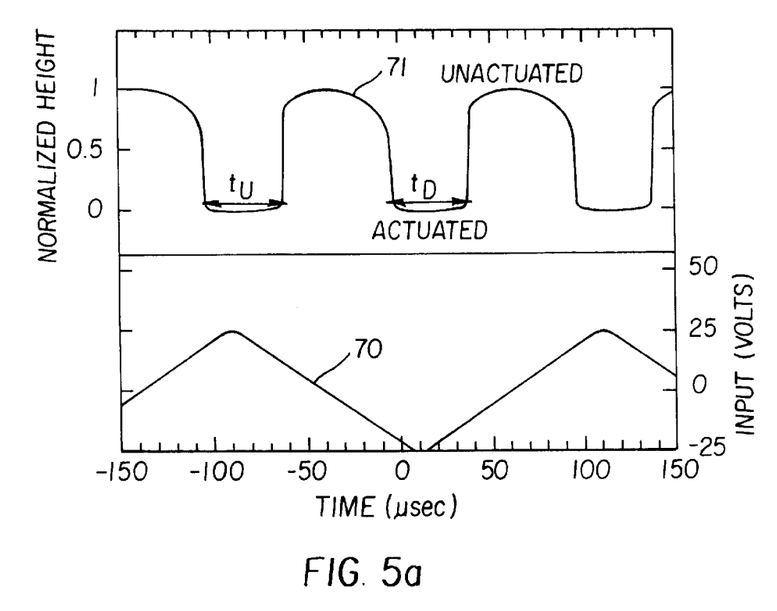
FIGS. 5a–5b show a stable behavior of the ribbon elements actuated by a bipolar triangular waveform.
Figure 5B:
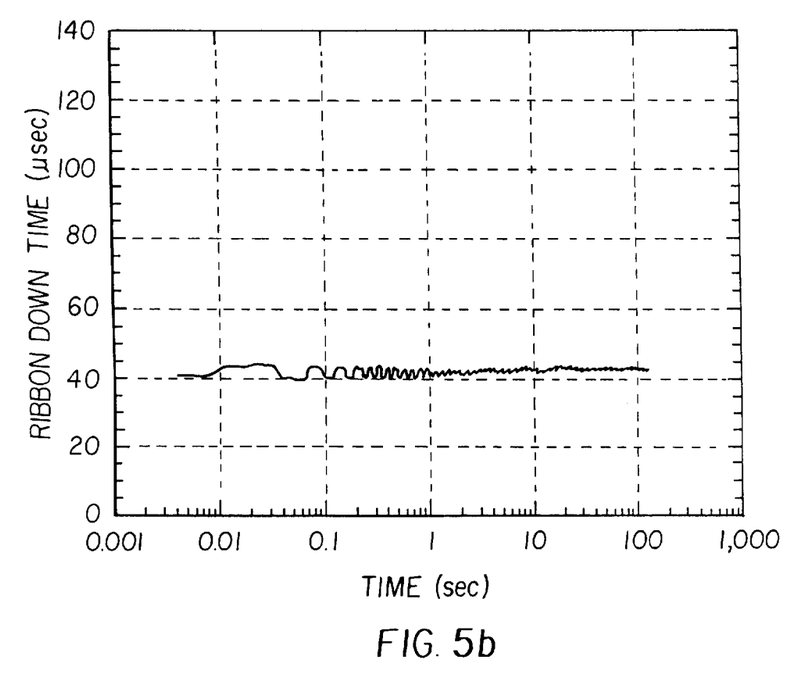

In order to achieve stable device operation, the ribbons can be actuated as shown in FIG. 5a with a bipolar triangular waveform 70. In this mode of operation, any dielectric charging that occurs during the positive portion of the waveform is canceled during the negative portion and vice versa, resulting in a stable ribbon response 71. The ribbon down time is equal during both positive and negative portion of the waveform and is independent of time from initial actuation as shown in FIG. 5b.

Figure 6:
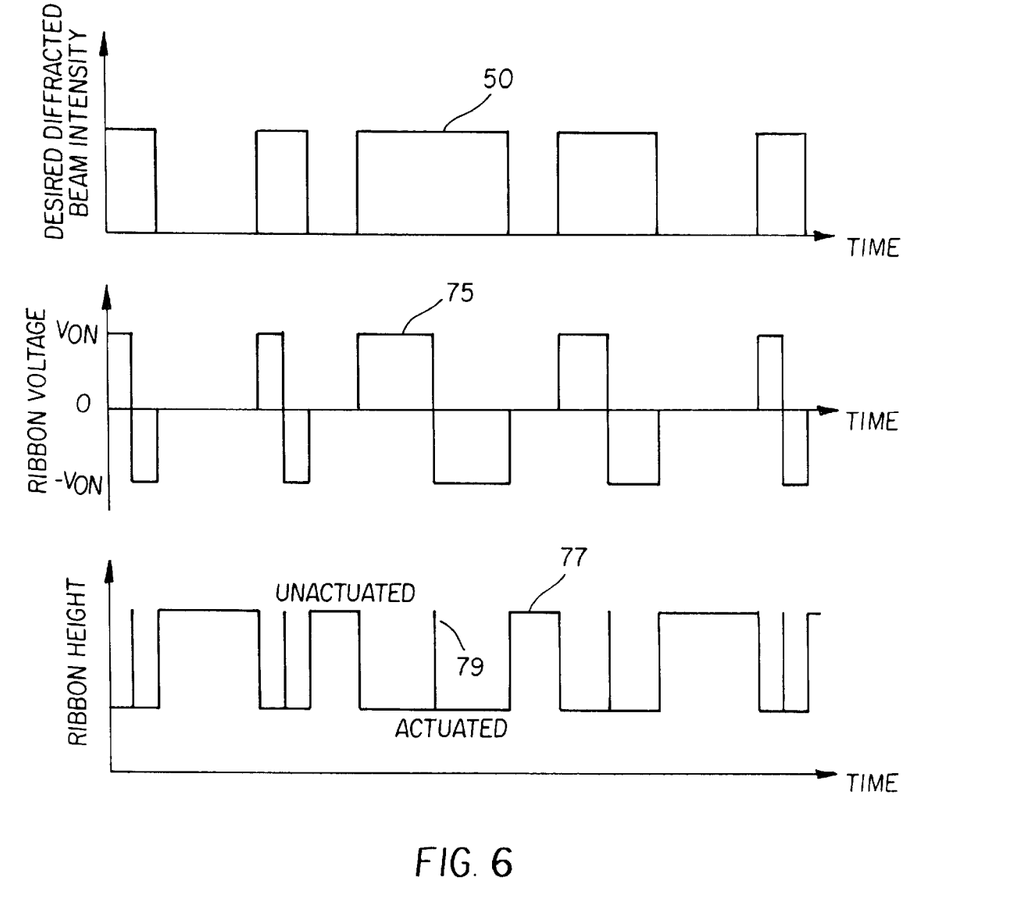
FIG. 6 is an illustration of a bipolar voltage waveform for actuating the ribbon elements to generate pulse width modulated light.

The dielectric charging effects that occur with a unipolar ribbon voltage waveform 60 (see FIG. 4a) prevent proper pulse width modulation of the diffracted light intensity. In such situations, the light intensity can be modulated with an appropriately chosen DC-free bipolar waveform. One scheme is illustrated in FIG. 6 for the case of pulse width modulation. The data to be sent to the GLV is provided as a pulse width modulated data stream 50. To obtain a diffracted light pulse of a given length of time, a modulated bipolar voltage 75 is applied to the ribbon elements 31. The modulated bipolar voltage 75 is positive for the first half of the pulse and negative for the second half. The ribbon response 77 is nearly the same as that of the unipolar waveform in FIG. 3. There is a small time interval 79 during the change of polarity during which the ribbons are released. With electronics possessing large enough voltage slew, the diffracted light intensity will only be affected for an insignificant interval of time by this brief release.

Figure 7:
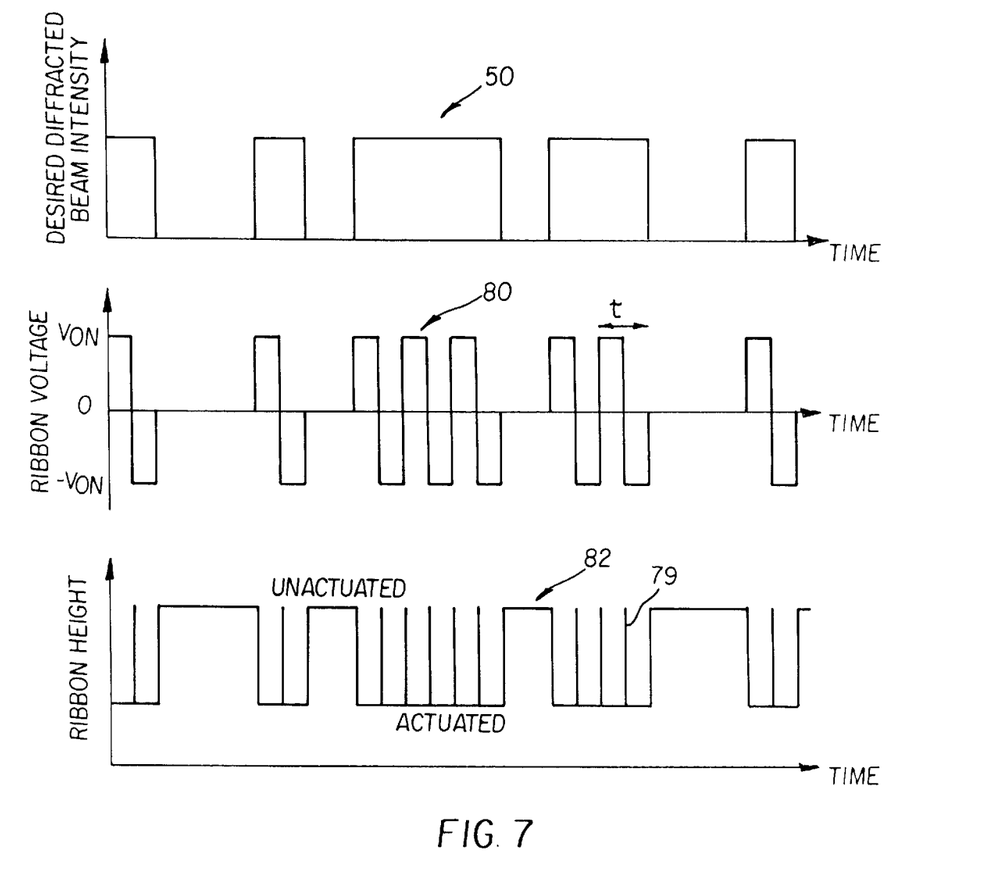
FIG. 7 is an illustration of an alternate bipolar voltage waveform for actuating the ribbon elements to generate pulse width modulated light.

Alternatively, each pulse in the waveform (data stream 50) can be divided into several positive and negative polarity portions. FIG. 7 shows one scheme that is straightforward to implement in a practical circuit. The data to be sent to the GLV is provided as a pulse width modulated data stream 50. To generate a modulated bipolar voltage 80, each pulse width in the data stream 50 is divided into an equal number positive and negative portions each having the same length τ/2. A resulting ribbon response 82 is nearly the same as that of the ribbon response in FIG. 6. Because each change of polarity causes the ribbon elements 31 to be released, there can be more than one small time interval 79 within one pulse width.

Figure 8:
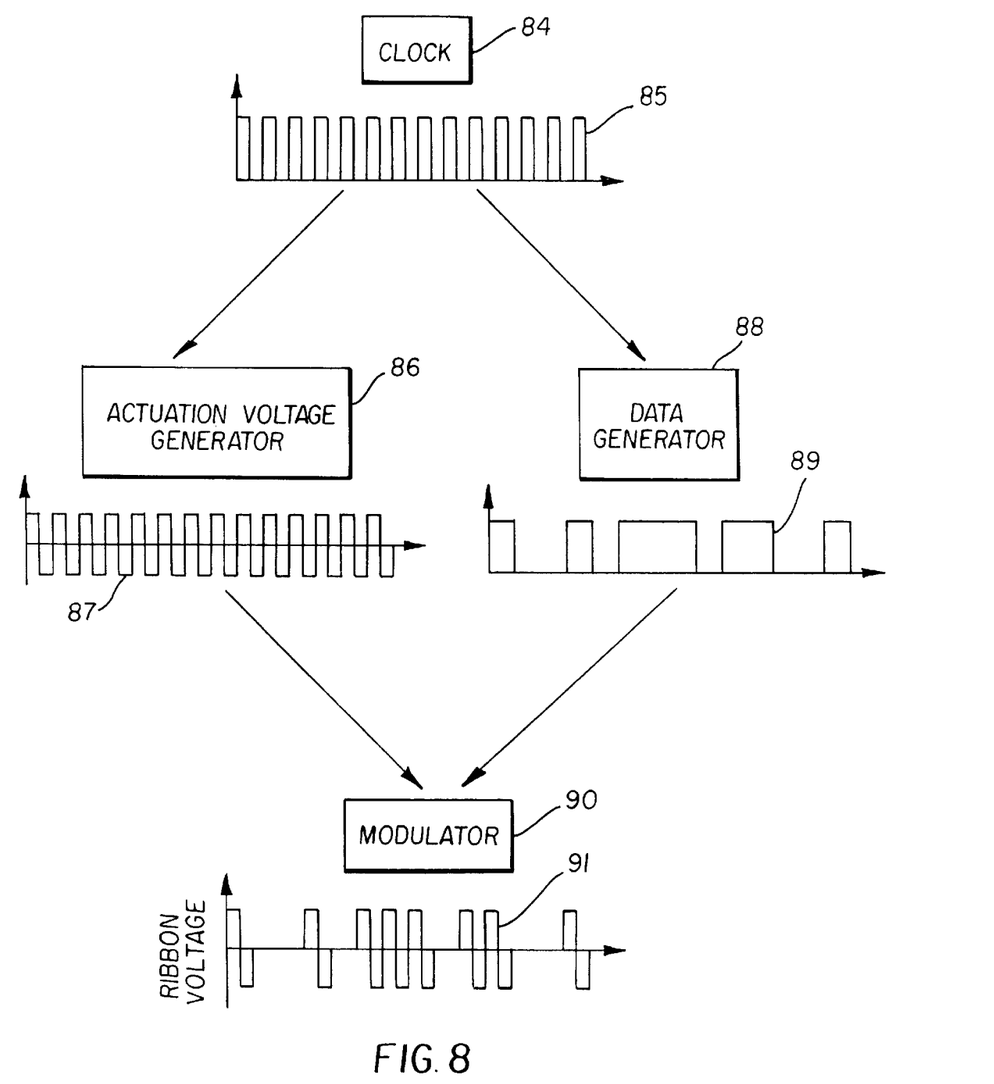
FIG. 8 is a block diagram of a circuit that generates a bipolar voltage waveform for pulse width modulated light.

The above described modulation can be carried out with a system as disclosed in FIG. 8. The subdivision of the different pulse widths is accomplished with the block diagram depicted in FIG. 8. A clock circuit 84 provides a continuous sequence of timing pulses 85 with period τ to an actuation voltage generator 86, which produces a periodic bipolar voltage 87, and to a data generator 88, which produces a pulse width modulated signal 89. A modulator 90 then uses the pulse width modulated signal 89 as a gate to produce a modulated bipolar voltage 91 which is applied to the ribbon elements 31.

Figure 9:
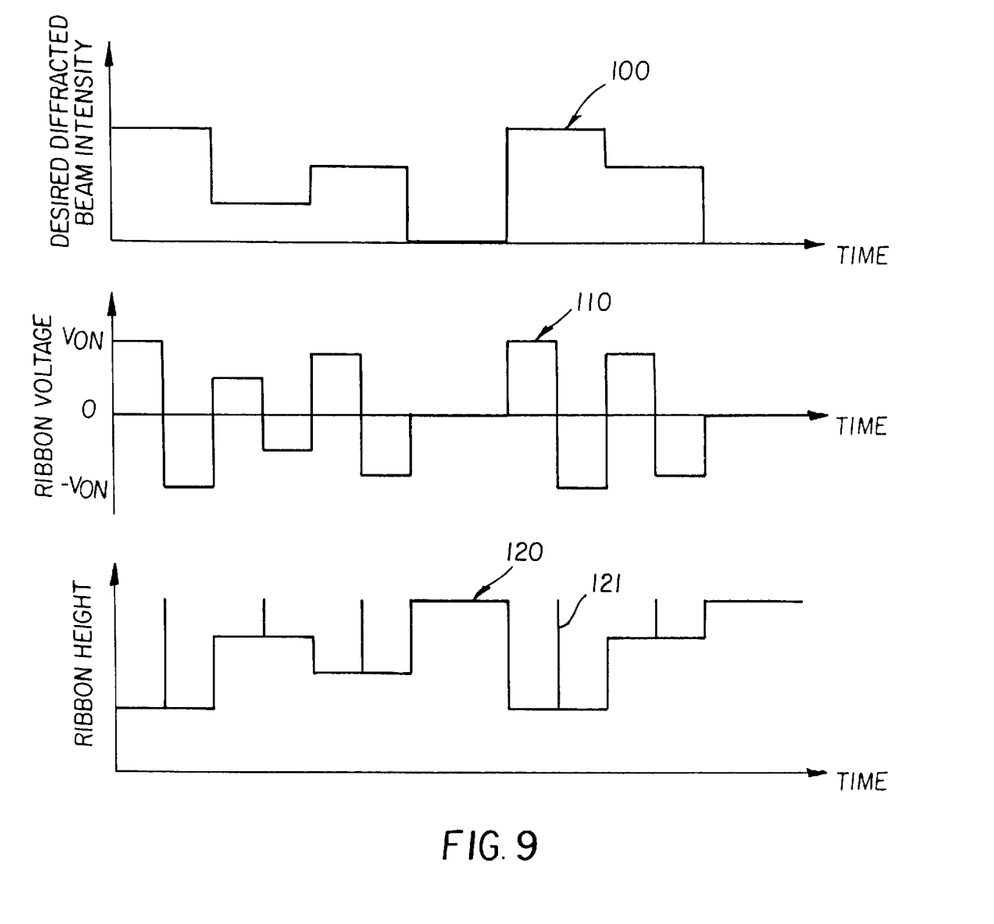
FIG. 9 is an illustration of a bipolar voltage waveform for actuating the ribbons to generate pulse amplitude modulated light.

Other kinds of light intensity modulation, such as pulse amplitude, pulse position and hybrid methods, which combine, for example, pulse amplitude and pulse width modulation, can also be implemented with a bipolar ribbon voltage waveform. FIG. 9 illustrates the case of pulse amplitude modulation where each pulse interval of a data stream 100 is of a fixed length, and the amplitude is varied from one pulse interval to the next, but has a constant height within each pulse interval. The modulated bipolar voltage 110 is generated in accordance to the data stream 100 such that each pulse with constant height produces two pulses of equal width and opposite polarity in the modulated bipolar voltage 110. As discussed later, the bipolarity of the voltage signal has to be considered with respect to a bias voltage applied to the bottom conductive layer 22. When the modulated bipolar voltage 110 is applied to the ribbon elements 31, more than two different levels of the ribbon elements is achieved. There is a small time interval 121 during the change of polarity during which the ribbons are released. During this time interval the ribbon element 31 may jump back to the un-actuated state. As before, with electronics possessing large enough voltage slew, the diffracted light intensity will only be affected for an insignificant interval of time by this brief release.

The bipolar voltage waveforms 75, 80 and 110 in FIGS. 6, 7 and 9 contain higher frequencies and larger voltage swings than the unipolar waveforms 52 and 56 in FIG. 3.

Figure 10:
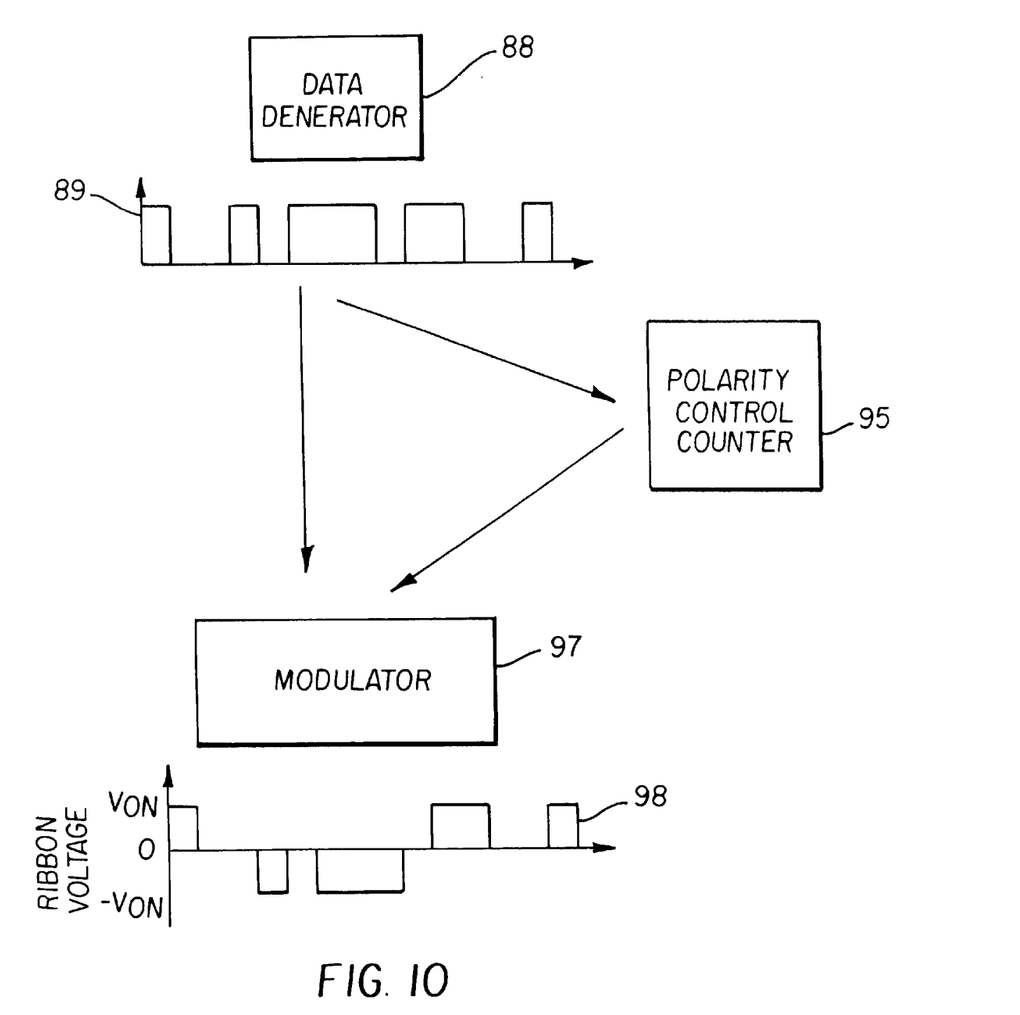
FIG. 10 is a block diagram of a circuit that generates a bipolar voltage waveform with a less frequent change in polarity.

In certain cases, it is preferable to vary the polarity of the waveform less frequently while maintaining an average voltage of zero, as illustrated in FIG. 10 for the case of pulse width modulation. The data generator 88 sends the pulse width modulated signal 89 to a modulator 97 and a polarity control counter 95. The counter 95 keeps track of the total amount of time a certain polarity has been used to actuate the ribbon elements 31. When this time exceeds a specified period, the counter 95 sends a signal to the modulator 97 to switch polarity. The counter 95 is then reset and restarted. The resulting bipolar ribbon voltage 98 is DC-free.

Figure 11:
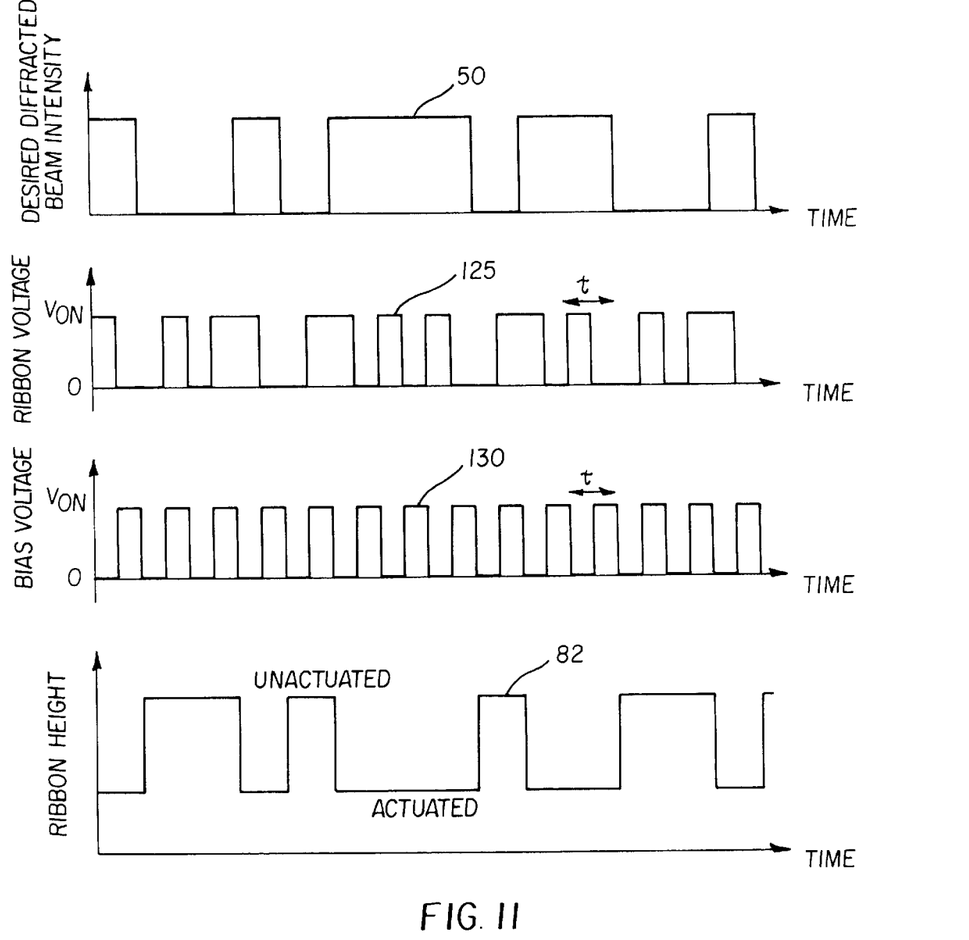
FIG. 11 is an illustration of an alternate voltage waveform for actuating the ribbon elements to generate pulse width modulated light wherein the bias voltage on the bottom conductive layer is time varying.

It is not possible to obtain bipolar voltages with certain types of driver circuitry. In such cases, the bottom conductive layer 22 can be biased at a fixed non-zero voltage and a unipolar waveform, whose time average is equal to this bias voltage, can be used to actuate the ribbon elements 31. Electrical isolation of the bottom conductive layer 22 of the electromechanical grating element from the ground plane of the driver circuitry is then preferable. If the bias voltage is time varying, it is possible to minimize charging with a unipolar waveform with only two levels. This scheme requires the time average of the unipolar waveform to be equal to the time average of the bias voltage. FIG. 11 shows an example of this scheme for the pulse width modulated data stream 50. The bias voltage 130 is a unipolar square wave with period τ and the ribbon voltage 125 during each interval τ/2 is chosen so as to achieve the desired sate of the ribbon element, either actuated or unactuated. Charging effects are reduced by this scheme as well. However the unipolar waveform must contain at least three voltage levels: one voltage greater than the vias voltage, one less than the bias voltage and one equal to the bias voltage. The first two voltage levels produce the actuated state of the ribbon element and the last produces the unactuated state. In practice the time average of the waveform can be slightly different from the bias voltage while still maintaining stable operation of the ribbon elements.

Figure 12:
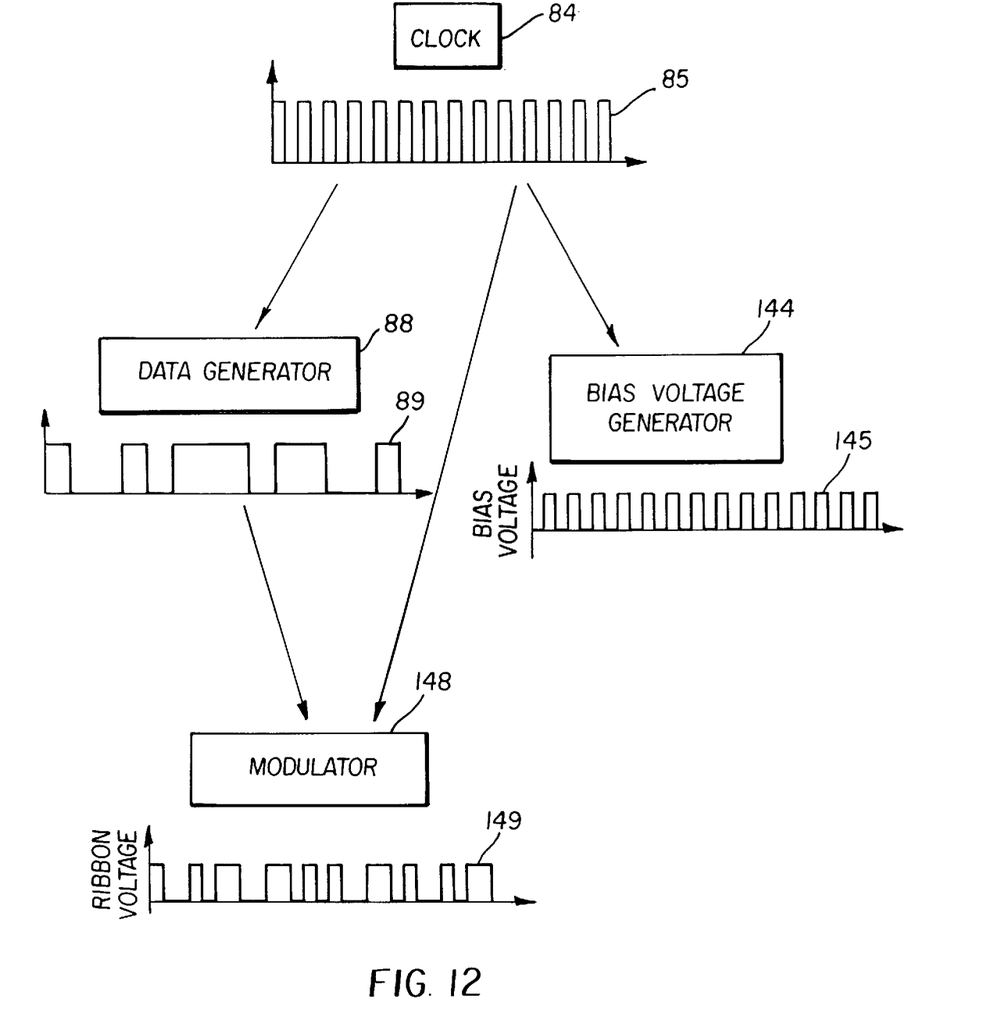
FIG. 12 is a block diagram of a circuit that generates a bipolar voltage waveform for actuating the ribbon elements to generate pulse width modulated light.

The above described modulation can be accomplished with a system as disclosed in the block diagram depicted in FIG. 12. The clock circuit (see FIG. 8) provides a continuous sequence of timing pulses 85 to the data generator 88 which produces a pulse width modulated signal 89, and to a bias voltage generator 144 which produces a periodic unipolar bias voltage 145. A modulator 148 then uses the pulse width modulated signal 89 and the timing pulses 85 from the clock 84 to generate a modulated unipolar voltage 149. The desired ribbon response is achieved by applying the modulated unipolar voltage 149 to the conductive layer 32 of the ribbon elements and applying the periodic unipolar bias voltage 145 to the bottom conductive layer 22.

The invention has been described in detail with particular reference to certain preferred embodiments thereof, but it will be understood that variations and modifications can be effected within the spirit and scope of the invention.

PARTS LIST 14 incident light beam
15 reflected light beam
16 incident light beam
17 diffracted light beam into $1^{st}$ order
18 diffracted light beam into $1^{st}$ order
20 substrate
22 bottom conductive layer
23 surface of the substrate
24 protective layer
26 spacer layer
27 upper surface level
28 channel
30 ribbon layer
31 ribbon elements
32 reflective layer
34 via openings
36 conducting material
50 pulse width modulated data stream
52 ribbon element voltage
54 ribbon height
56 ribbon element voltage with negative polarity
60 unipolar triangular waveform
61D minimum of unipolar triangular waveform
61U maximum of unipolar triangular waveform
62 graph
63 graph
65 time period after onset of actuation
67 time period after onset of actuation
70 bipolar triangular waveform
71 stable ribbon response
75 modulated bipolar voltage
77 ribbon response
79 time interval
80 modulated bipolar voltage
82 ribbon response
84 clock circuit
85 continuous sequence of timing pulses
86 voltage generator
87 periodic bipolar voltage
88 data generator
89 pulse width modulated signal
90 modulator
91 modulated bipolar voltage
95 counter
97 modulator
98 modulated bipolar voltage
100 data stream with varied amplitude
110 modulated bipolar voltage
120 ribbon response
121 time interval
125 ribbon element voltage
130 bias voltage
144 bias voltage generator
145 unipolar bias voltage
148 modulator
149 modulated unipolar voltage
$t_U$ time interval
$t_D$ time interval
τ period of timing pulses

What is claimed is:

1. A method for actuating electro-mechanical ribbon elements suspended over a channel defining a bottom surface and having a bottom conductive layer formed below said bottom surface, the method comprises the steps of:

providing a data stream;
    generating from said data stream a modulated bipolar voltage signal whose time average is equal to the time average of a bias voltage applied to the bottom conductive layer; and applying said modulated bipolar voltage signal to the ribbon elements.

2. The method as claimed in claim 1 wherein the generating step comprises the steps of:
providing a bipolar actuation voltage with respect to the bias voltage applied to the bottom conductive layer; and
multiplying the data stream with the bipolar actuation voltage to create the modulated bipolar voltage signal.

3. The method as claimed in claim 2 wherein the bipolar actuation voltage and the data stream are generated in accordance to one clock signal.

4. The method as claimed in claim 2 wherein the data stream is pulse width modulated.

5. The method as claimed in claim 2 wherein the data stream is pulse amplitude modulated.

6. The method as claimed in claim 1 comprises:
generating the modulated bipolar voltage signal in accordance to the data stream wherein each pulse width of the data stream produces two pulses of equal width and opposite polarity in the modulated bipolar voltage signal with respect to the bias voltage applied to the bottom conductive layer.

7. The method as claimed in claim 1 wherein the polarity of the modulated bipolar voltage signal is controlled by polarity control counter.

8. The method as claimed in claim 1 wherein the bias voltage applied to the bottom conductive layer has a consort value.

9. The method as claimed in claim 8 wherein the constant value of the bias voltage applied to the bottom conductive layer is zero.

10. A system for actuating electro-mechanical ribbon elements suspended over a channel defining a bottom surface and having a bottom conductive layer formed below said bottom surface the system comprises:
a data generator for providing a data stream; and
a modulator for generating from said data stream a modulated bipolar voltage signal whose time average is equal to the time average of a bias voltage applied to the bottom conductive layer.

11. The system as claimed in claim 10 comprises an actuation voltage generator for providing a bipolar actuation voltage to the modulator.

12. The system as claimed in claim 11 comprises a clock signal generator for producing a periodic signal and applying simultaneously said periodic signal to said actuation voltage generator and said data generator.

13. The system as claimed in claim 10 comprises a bias voltage generator for providing the bias voltage to the bottom conductive layer.

14. A system for actuating electro-mechanical ribbon elements suspended over a channel defining a bottom surface and having a bottom conductive layer formed below said bottom surface the system comprises:
a data generator for providing a data stream;
a polarity control counter; and
a modulator for generating from the data stream a modulated bipolar voltage signal controlled by said polarity control counter.

* * * * *